July 15, 1969     H. G. WASHBURN     3,454,980

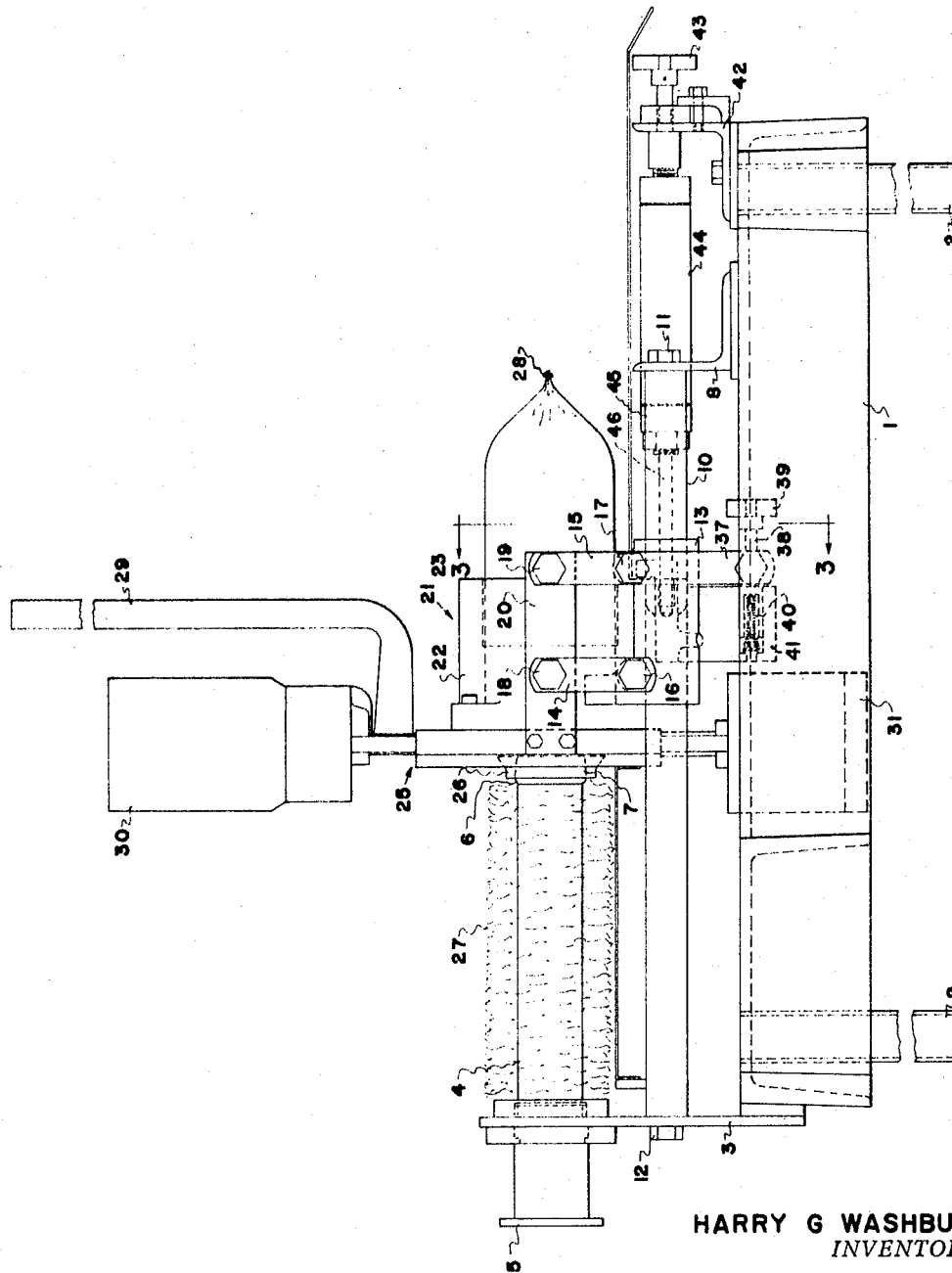

CASING SIZER AND SIZING PROCESS

Filed Oct. 6, 1966     3 Sheets-Sheet 2

INVENTOR.
HARRY G WASHBURN
BY
his attorney

July 15, 1969

H. G. WASHBURN 3,454,980

CASING SIZER AND SIZING PROCESS

Filed Oct. 6, 1966

HARRY G WASHBURN
*INVENTOR.*

BY *Neal J Mosely* his attorney

United States Patent Office 3,454,980
Patented July 15, 1969

3,454,980
CASING SIZER AND SIZING PROCESS
Harry G. Washburn, Park Forest, Ill., assignor to
Tee-Pak, Inc., a corporation of Illinois
Filed Oct. 6, 1966, Ser. No. 584,732
Int. Cl. A22c *11/02, 11/06*
U.S. Cl. 17—35                                    10 Claims

ABSTRACT OF THE DISCLOSURE

An apparatus for controlling the size of stuffed sausages by controlling the rate of flow of sausage casing off of a stuffing horn includes a tubular sleeve member defining the desired size of stuffed sausage and carrying an annular rubber ring is spring-loaded into engagement with the end of the stuffing horn. The sizing apparatus has the sleeve member arranged for endwise movement relative to the stuffing horn and presses the casing coming off the stuffing horn against the end of the horn with a predetermined force to determine the size of the casing being stuffed. If the casing tends to overstuff, it drags on the sleeve member and pulls the friction ring away from the end of the stuffing horn and allows the casing to feed off more freely. The endwise movement of the sleeve member is, therefore, operable to control the size of the stuffed sausage accurately with respect to the size of the bore of the sleeve.

---

Figure 3:
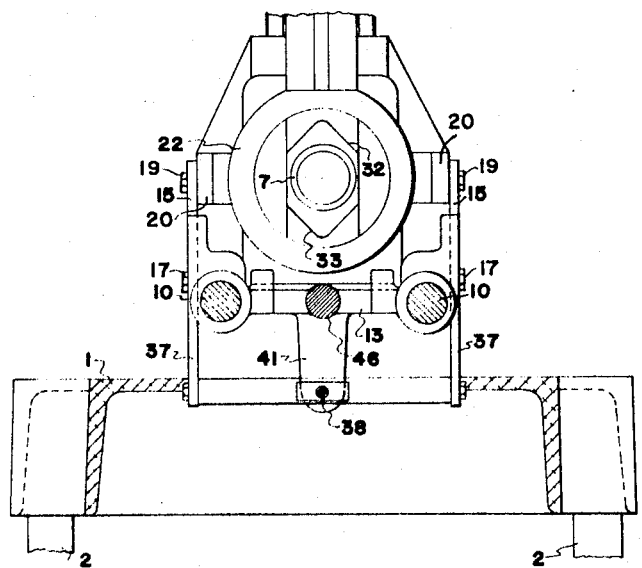

This invention relates to new and useful improvements in apparatus for stuffing sausage meat into sausage casings and more particularly to an improved apparatus for controlling the size of stuffed sausages by controlling the rate of flow of sausage casing off the stuffing horn.

In the preparation of sausages, a sausage paste or emulsion is formed of comminuted meat, together with fillers, seasonings, spices, etc., and is used to fill sausage casings. The sausage emulsion is introduced through a stuffing horn into a sausage casing. In the case of small sausages, the casing which is filled with sausage emulsion is twisted, tied or clipped and thus formed into suitable links at predetermined intervals and is subsequently processed. In the case of large sausages, such as bolognas, salamis, and the like, the sausage meat emulsion is introduced into a large, heavy-walled casing with the end closed, and is formed into a single large link or stick of sausage. The casing filled with the sausage meat may be subjected to cooking, smoking, etc., or in some cases may be supplied to the customer without additional processing. Small sausages, of the frankfurter and knockwurst or Vienna type, are generally smoked and cooked and the casing removed prior to marketing.

In the preparation of large diameter sausages, a fibrous or miscellaneous casing is placed on a stuffing horn and the end of the casing closed off in preparation for filling. The sausage emulsion is ejected through the horn which causes the casing to feed off and be filled. The stuffing apparatus is usually used in combination with a typing or clipping apparatus for forming the filled casing into links or sticks of predetermined length. In stuffing casing to form large sausages, the stuffing machine operator usually holds the casing on the stuffing horn with one hand to restrict the flow off the horn while operating the sausage meat valve with his other hand. It is necessary to hold the casing on the horn both to restrict the flow off of the horn to prevent meat from flowing backward around the horn and filling the casing at that point. This has presented some safety hazards and has been quite inefficient. There has been a considerable need in the sausage making industry for a suitable mechanism or process for controlling the flow of large diameter sausage casing off the stuffing horn while permitting the stuffing machine operator to use both hands and controlling other portions of the equipment.

In preparing large diameter sausages, another important consideration is the maintenance of accurate size control over the stuffed sausage being produced. It is very important that the diameter of large sausages be controlled very carefully so that the meat packer may slice the sausage into slices of predetermined thickness and diameter for prepackaging. The slices must be accurately sized so that a given number of slices weigh a precisely predetermined amount. When a meat packer is prepackaging sliced sausage meats he requires that a given number of slices weigh exactly one pound or some other preselected weight. In stuffing large diameter sausages, there is some tendency to obtain a variation in sausage diameter depending upon the stretch characteristics of the sausage casing and the pressure used in stuffing. There is less variation in diameter of stuffed sausages which use fibrous casing than those which use miscellaneous casing. However, accurate size control is required for both types of casing where the sausage is to be sliced and packaged prior to delivery to the retailer.

The prior art has given relatively slight consideration to the problem of controlling the flow of casing off a stuffing horn and in particular controlling the size of the stuffed sausage product. Hottmann U.S. Patent 1,366,183 discloses a sausage stuffing and linking apparatus having spring loaded friction shoes that engage a sausage casing at the end of the stuffing horn and retard the flow of casing off the stuffing horn. Short U.S. Patent 3,192,559 discloses a sausage casing sizing apparatus which comprises a free-floating rubber ring which is positioned around a sausage casing and floats against the clipper or tyer in a stuffing machine assembly. The free-floating rubber ring engages the stuffed casing and frictionally retards its flow off of the stuffing horn. This construction prevents the flow of sausage emulsion back around the stuffing horn and insures that the sausage stick is fully stuffed. The Short apparatus, however, does not control the size of the stuffed sausage product accurately since it does not provide a variable control for the flow of sausage casing off the stuffing horn in response to variations in size of the stuffed sausage product.

It is therefore one object of this invention to provide a new and improved process and apparatus for use in combination with a stuffing machine to control the flow of casing off the stuffing horn.

Another object of this invention is to provide a new and improved process and apparatus for use in combination with a stuffing machine to restrict the flow of sausage casing variably off a stuffing horn and thus control the size of stuffed sausages produced upon filling of the casing.

Still another object of this invention is the provision of an improved process and apparatus used in conjunction with a stuffing machine wherein the rate of flow of sausage casing off of the stuffing horn is varied in accordance with the diameter of a stuffed sausage product.

A feature of this invention is the provision of an improved process and apparatus wherein friction means is applied with variable force to sausage casing being fed off of a stuffing horn and the amount of frictional force is varied in accordance with the size of the sausage product produced.

Another feature of this invention is the provision of an improved process and apparatus which includes means responsive to the diameter of a stuffed sausage for applying a variable friction force to the sausage casing at the time of stuffing and thus producing a sausage of substantially constant predetermined diameter.

Other objects and features of this invention will become apparent from time to time throughout the specification and claims as hereinafter related.

SUMMARY OF THE INVENTION

This invention comprises a new and improved stuffing and sizing apparatus for the production of stuffed sausage products. The apparatus includes a stuffing horn on which a sausage casing is placed (preferably in a shirred condition) for filling with sausage emulsion. The apparatus includes a friction device engageable with the casing to press it against the stuffing horn while the casing is being fed from the stuffing horn and stuffed. The friction device is movable to apply a variable friction force and is operated by means responsive to the diameter of the stuffed casing product. The responsive means is preferably a friction device against which the stuffed casing moves and is operable when the casing over-expands to move the first-named friction device away from the stuffing horn to permit the casing to flow off the horn more freely. This variable movement of the friction device at the stuffing horn by the friction device against which the stuffed casing moves is operable to control the size of the stuffed casing accurately.

Figure 2:
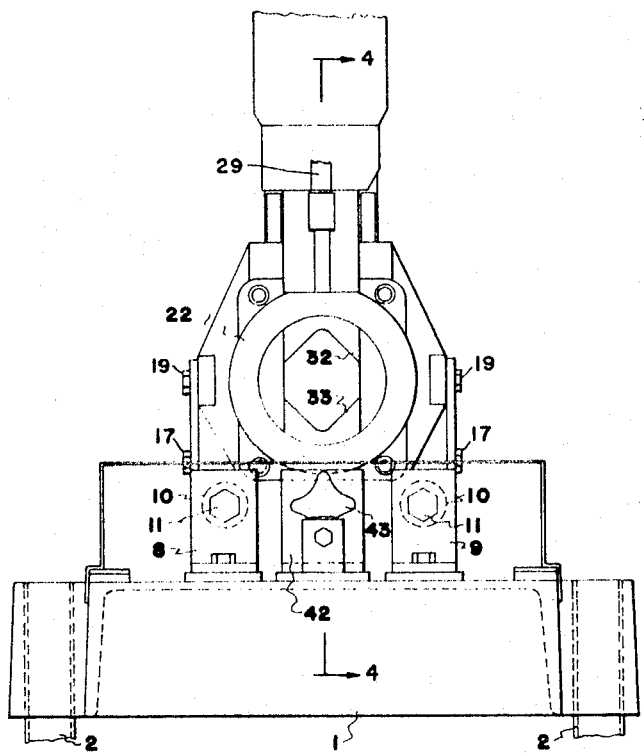

In the accompanying drawings, to be taken as part of this specification, there is clearly and fully illustrated a preferred embodiment of this invention, in which drawings, FIG. 1 is a view in side elevation of the sausage stuffing and linking device with a partially formed sausage illustrated therein, FIG. 2 is a view in right elevation of the apparatus shown in FIG. 1 with the stuffed sausage removed, FIG. 3 is a sectional view taken on the line 3—3 of FIG. 1.

Figure 5:
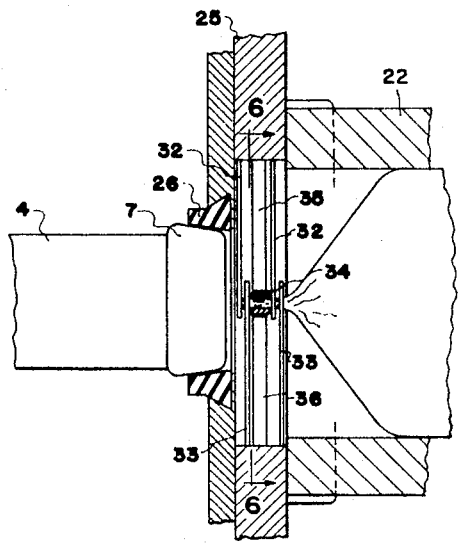
Figure 6:
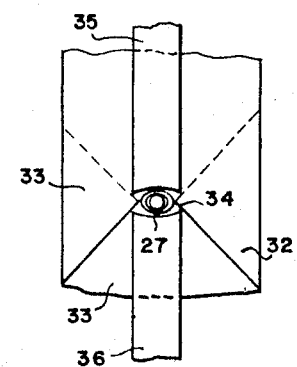
Figure 4:
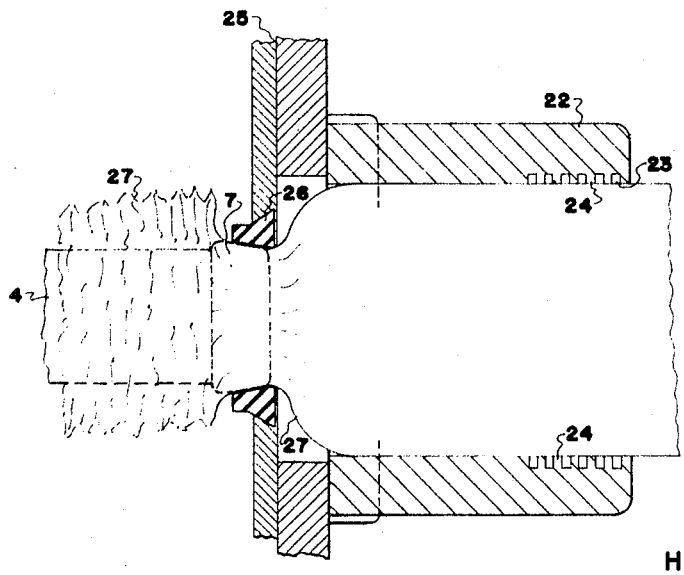

FIG. 4 is a detail view, taken in longitudinal section, on the line 4—4 of FIG. 2 of the end of the stuffed horn and the casing sizer, FIG. 5 is a detail view, in section, of the end of the casing sizer, as shown in FIG. 4, showing the clipper in operation, and FIG. 6 is a detail sectional view taken on the line 6—6 of FIG. 5 showing the casing clipper in operated position.

Referring to the drawings by numerals of reference, and more particularly to FIG. 1, there is shown a combined sausage stuffing horn and sizer apparatus for regulating the rate of feed of sausage casing and the size of stuffed sausage products. The apparatus comprises a table portion 1 having vertically extending tubular supporting legs 2. At the left end of table 1 there is secured a vertically extending plate 3 which supports a stuffing horn 4. Stuffing horn 4 has a flanged end 5 for connection to a source of sausage emulsion for preparation of sausages and has a slightly enlarged end portion 6 having a conical face 7.

At the right end of table 1 there are provided a pair of abutments 8 and 9 which support the ends of rods 10, the other ends of which are supported in vertically extending plate 3. Rods 10 are secured by nuts 11 in abutments 8 and 9 and by nuts 12 at supporting plate 3.

Supported on rods 10 is carriage 13 which is slidably movable along the rods. Carriage 13 provides a fixed support for supporting levers 14 and 15. Levers 14 and 15 are secured on carriage 13 by bolts 16 and 17 respectively and are secured at their upper ends by bolts 18 and 19 to supporting plate 20. Supporting plate 20 is in turn secured on and supports casing sizer 21. Casing sizer 21 includes sleeve member 22 having a bore portion 23 provided with internal ribs 24 (shown in FIG. 4) arranged to provide a surface for frictional response to the expansion of the sausage casing being stuffed in the apparatus.

Sleeve member 22 also supports a clipper device 25 which is a well-known casing clipper made by Tipper Tie Division, Rheem Manufacturing Company. Sleeve member 22 also supports annular ring 26 which is of rubber or plastic or other elastomeric material and engages the conical face 7 of stuffing horn 4 to control the rate of feed of casing off of the stuffing horn. In this apparatus the casing is designated 27 and is shown in a shirred condition on stuffing horn 4. Casing 27 is tied or otherwise closed at the end of the stuffing horn as indicated at 28. As the sausage meat emulsion is ejected into the casing, the casing is expanded and completely filled with sausage. The expanded casing is limited in size by the internal diameter of sleeve member 22. The rate of flow of casing off of stuffing horn 4 is controlled by the amount of friction introduced by annular ring 26 against conical face 7 of stuffing horn 4 and also by the amount of fritcion at the ribbed surface 24 of sleeve member 22.

The casing clipper 25 is a commercially available clipper which is secured in the apparatus as shown in the drawings. Clipper 25 includes an arm or hopper 29 for storage and supply of ring shaped clips which are used for securing the end of the stuffed sausage. Clipper 25 is provided with upper air cylinder 30 and lower air cylinder 31 which are operated by a source of compressed air (not shown). Air cylinder 30 operates upper and lower clamping members 32 and 33 provided with V-shaped notches respectively. A second set of clamping members 32 and 33 are provided in the clipper and operated by cylinder 31. When the clamping members are brought together by air cylinder 31 the casing end is closed by engagement of the V-shaped notches as indicated in FIGS. 5 and 6. Members 32 and 33 clamp the casing to hold it tightly closed while the clip is applied. A casing clip 34 is applied around the clamped casing as shown in FIG. 5. Next, air cylinder 30 operates compression members 35 and 36 which move reciprocally between the clamping members 32 and 33. Compression members 35 and 36 engage clip 34 as shown in FIGS. 5 and 6 and compress the clip to cause it to secure the end of the casing tightly against leakage of sausage meat from the fully stuffed sausage.

The casing sizer 21 is constructed for maintaining accurate control of the size of the stuffed sausage product. Lever 15 which supports the sizer 21 has a U-shaped lower extension 37 through which there is positioned adjustment screw 38 provided with adjusting knob 39. Adjustment screw 38 cooperates with spring 40 and is adjustable to vary the amount of spring compressive force exerted against lever extension 37. Spring 40 is positioned between the lower end of lever extension 37 and downwardly extending arm or abutment 41 on movable carriage 13.

The entire sizer apparatus 21 is mounted on rods 10 by means of carriage 13 as previously described. Carriage 13 is arranged for longitudinal movement along rods 10. Supporting table 1 is provided with bracket 42 which supports an adjustment knob 43 for cylinder 44. Cylinder 44 cooperates with piston 45 having connecting rod 46 secured to carriage 13. Adjustment of knob 43 adjusts the position of piston 45 and thus moves carriage 13 and sizer device 21 into a predetermined position relative to stuffing horn 4. Adjustment of knob 39 varies the compressive force exerted by spring 40 and thus predetermines the compressive force exerted by annular ring 26 against conical face 7 on stuffing horn 4.

OPERATION

In operation, this apparatus is used for stuffing and sizing large-diameter sausage casings, usually fibrous casings. A large-diameter sausage casing is placed on stuffing horn 4 as indicated in FIG. 1. The casing may be preshirred and positioned on the stuffing horn in a shirred condition. Alternatively, the casing may in some instances be used without shirring or may be hand shirred onto the stuffing horn, depending upon the length of casing to be stuffed. The end portion of the casing is closed, as by tying or clipping, or a casing may be used which is preclosed and provided with an end closure 28 as shown in FIG. 1. The adjustment knob 43 is moved to cause the clipper and sizer to be moved into engagement with the end of the casing. In this position annular ring 26 engages the casing against conical face 7 as shown in FIGS. 1 and 4 of the drawing. Knob 39 is adjusted to establish the desired compressive force exerted by spring 40 on lever extension 37 which, in turn, predetermines the amount of compressive force exerted by annular ring 26 against casing 27 at the conical face 7 of stuffing horn 4.

The sausage meat is then pumped under pressure from a sausage batter tank (not shown) through stuffing horn 4 to fill the casing 27 as shown in FIGS. 1, 4, and 5. The sausage batter or emulsion fills the casing 27 to a size limited by the internal diameter of sizing sleeve 22. The rate of flow of casing off of stuffing horn 4 is determined by the friction maintained between annular ring 26 and the conical face 7 of stuffing horn 4. When the flow of casing is retarded the sausage emulsion, which is supplied under substantially constant pressure, caues the casing to fill more firmly. If the casing tends to overstuff it is compressed against the inside of sleeve 22 and frictionally engages that sleeve. The ribbed portions 24 provide for a greater application of frictional force by the casing against the inner surface 23 of sleeve 22. If the casing tends to overstuff it drags on sleeve 22 and moves the entire sizer apparatus 21 and clipper 25 away from the end of stuffing horn 4. This movement releases the pressure exerted by annular ring 26 against the conical face 7 of stuffing horn 4 and permits casing 27 to flow more freely off of the stuffing horn. This allows more casing to flow in relation to the amount of sausage batter or emulsion being pumped into it and the sausage therefore reduces slightly in diameter.

As the sausage is no longer so tightly filled the frictional force exerted on the inner surface 23, particularly the ribbed surface 24, of sleeve 22 is reduced and spring 40 urges the sizer apparatus back into engagement with the end of the stuffing horn. This apparatus is therefore operable to perform the dual function of preventing sausage emulsion from flowing back around the stuffing horn and maintains accurate size control over the sausage being produced. The size of the sausage, i.e. the diameter of the sausage being produced, is accurately controlled by the positioning of the sizing apparatus in relation to the end of the stuffing horn and the amount of compressive force exerted through spring 40. The variable compressive force applied by annular ring 26 against the casing at the conical face 7 of stuffing horn 4 is operable to maintain a very accurate size control over the casing so that the sausage produced will correspond almost exactly to the internal diameter of the sizer sleeve 22.

While the apparatus disclosed makes use of frictional force at the sleeve 22 for varying the amount of friction applied at the conical end 7 of stuffing horn 4, it will be obvious to those skilled in the art that any suitable means for sensing the size of the stuffed sausage casing may be used to apply a variable force against annular ring 26 and thus control the rate of flow of the casing from the stuffing horn and control the size of the stuffed sausage product.

What is claimed is:

1. In a process for producing sausages wherein a casing is placed on a stuffing horn and filled with sausage meat ejected therefrom, the improvement which comprises constantly applying an endwise force pressing the casing against the end of the stuffing horn to predetermine the friction on the casing at the point of flow off of the stuffing horn, and reducing the endwise force pressing the casing against the end of the stuffing horn in response to a tendency of the stuffed casing to enlarge beyond a predetermined size thereby maintaining the product sausage substantially uniform in diameter.

2. The combination with a sausage stuffing horn through which sausage meat is ejected and on which a casing is positioned for filling, of a sizer for controlling the diameter of sausages produced thereby, said sizer comprising means positioned for endwise movement into and out of engagement with the end of said stuffing horn to apply a variable endwise force thereagainst for controlling the rate of flow of casing off of the stuffing horn, and means responsive to variations in size of the sausage product and operatively connected to said casing flow controlling means to permit a faster rate of casing flow whenever the sausage product tends to exceed a predetermined diameter.

3. A casing sizer combination according to claim 2 in which said sizer comprises movable means positioned for endwise movement in engageable relation with the end of the stuffing horn to apply a frictional force to the casing flowing off of the horn, and means responsive to changes in the diameter of the sausage being produced and operatively connected to said movable friction force applying means to move the same to reduce the amount of friction applied to the casing in response to enlargement of the stuffed sausage beyond a predetermined diameter.

4. A casing sizer combination according to claim 2 in which said sizer includes means movable therewith and operable to close the end of a fully stuffed sausage.

5. A casing sizer combination according to claim 3 in which said movable means comprises an annular elastic resilient ring member engageable with the end of the stuffing horn, and said responsive means comprises a sleeve through which the stuffed sausage moves, said ring member being supported on said sleeve and movable therewith, and spring means urging said ring member and sleeve toward engagement with the end of said stuffing horn, the sausage upon overstuffing engaging the walls of said sleeve member and moving said sleeve member and ring member away from said stuffing horn.

6. A casing sizer combination according to claim 5 in which said stuffing horn has a conical end surface and said ring member is movable into and out of operative engagement therewith.

7. A casing sizer combination according to claim 5 in which said spring means is adjustable to vary the frictional force applied against the casing at the end of the stuffing horn.

8. A casing sizer combination according to claim 5 in which a movable support is provided for said sleeve and ring members and is movable toward and away from said stuffing horn.

9. A casing sizer combination according to claim 5 in which a casing clipping device is secured in said sizer between said sleeve and ring members and is movable therewith.

10. A casing sizer combination according to claim 2 in which sizer comprises
 (a) a support in fixed position relative to said stuffing horn,
 (b) a carriage movable along said support,
 (c) threaded adjustment means including an operating knob for adjusting a position of said carriage on said support,
 (d) a sleeve member having a ribbed inner surface and positioned for movement relative to said stuffing horn,
 (e) a plurality of supporting levers connected to said sleeve member and carriage to support said sleeve member for movement thereon,
 (f) spring means including a threaded adjustment member and operating knob therefor, engageable with a part of at least one of said supporting levers to apply an adjustable spring force urging said sleeve member toward engagement with said stuffing horn,
 (g) a casing clipper device secured on said sleeve member,
 (h) an annular ring member of resilient elastic material supported on said sleeve member adjacent to said clipper device and positioned to engage the end end of said stuffing horn, (i) said stuffing horn having a conical end face engageable by said ring member with the predetermined forced exerted by said spring means, and the sausage being stuffed being engageable with the ribbed inner surface of said sleeve member upon overstuffing to cause said sleeve member to move said ring member away from the stuffing horn to permit flow of casing off the stuffing horn at a faster rate.

References Cited

UNITED STATES PATENTS

| | | | |
|---|---|---|---|
| 2,999,270 | 9/1961 | Knapp | 17—35 |
| 3,140,509 | 7/1964 | Muller | 17—33 |
| 3,148,408 | 9/1964 | Good | 17—35 |
| 3,192,559 | 7/1965 | Short | 17—35 |
| 3,317,950 | 5/1967 | Ziolko | 17—41 X |

FOREIGN PATENTS

| | | |
|---|---|---|
| 490,941 | 2/1930 | Germany. |
| 812,307 | 4/1959 | Great Britain. |

LUCIE H. LAUDENSLAGER, Primary Examiner

U.S. Cl. X.R.

17—33, 41